Inventors
Igor Kamlukin
Nolan Rhoades

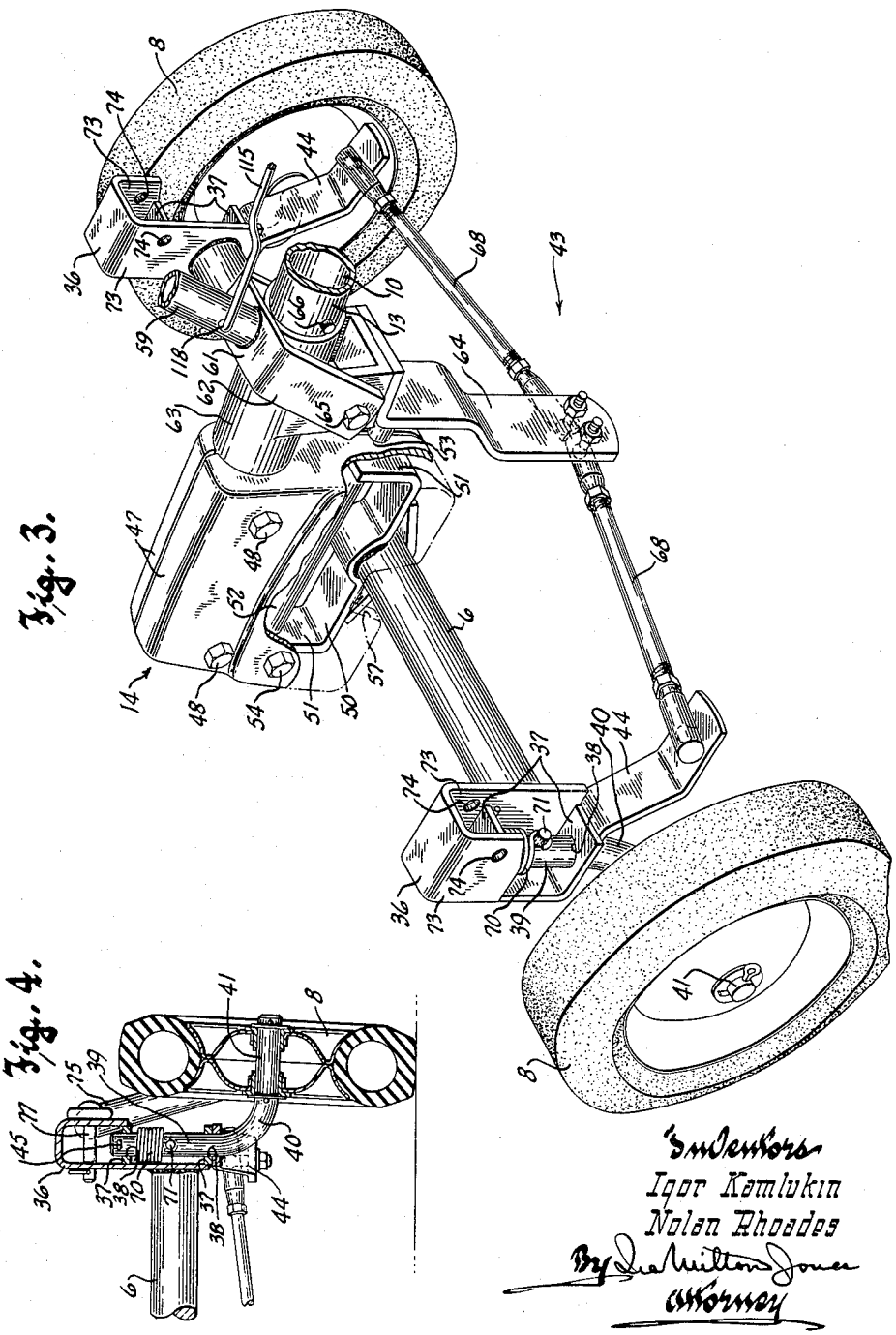

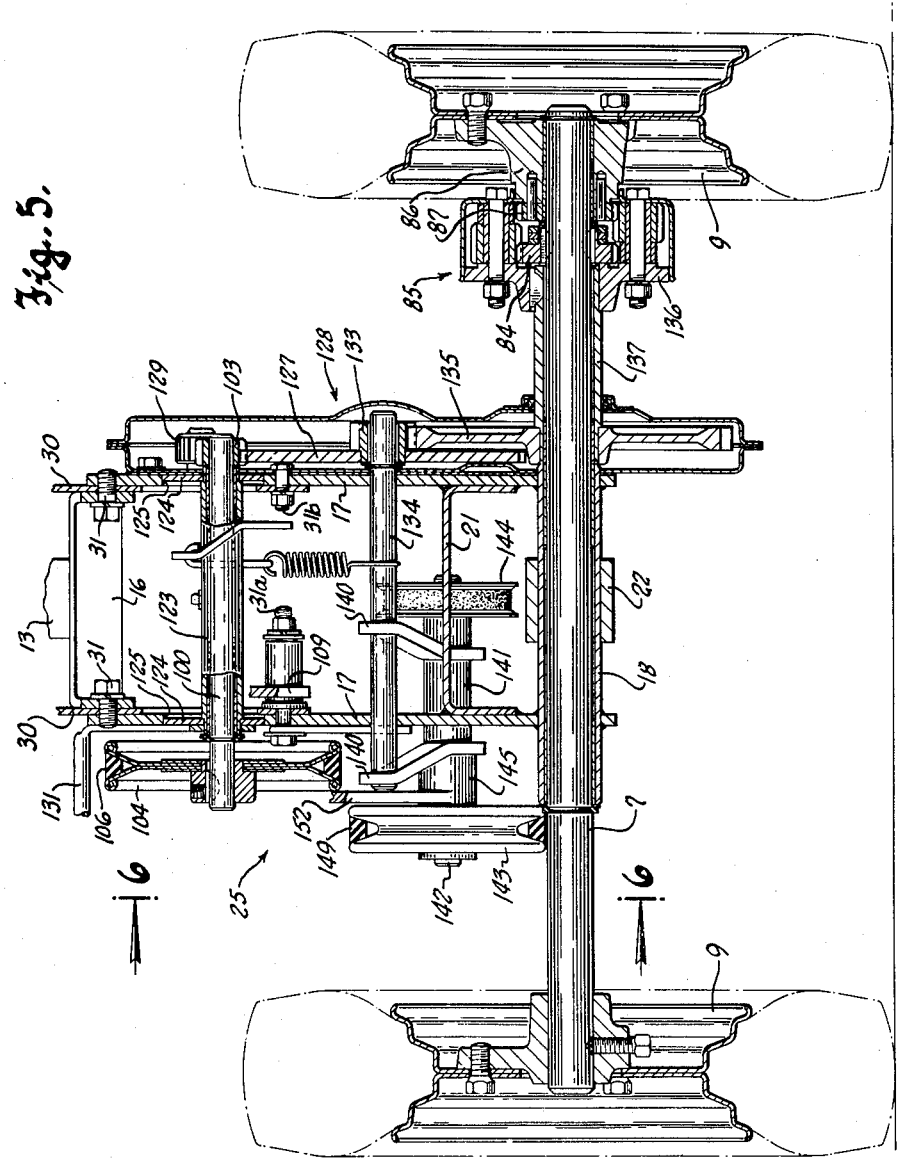

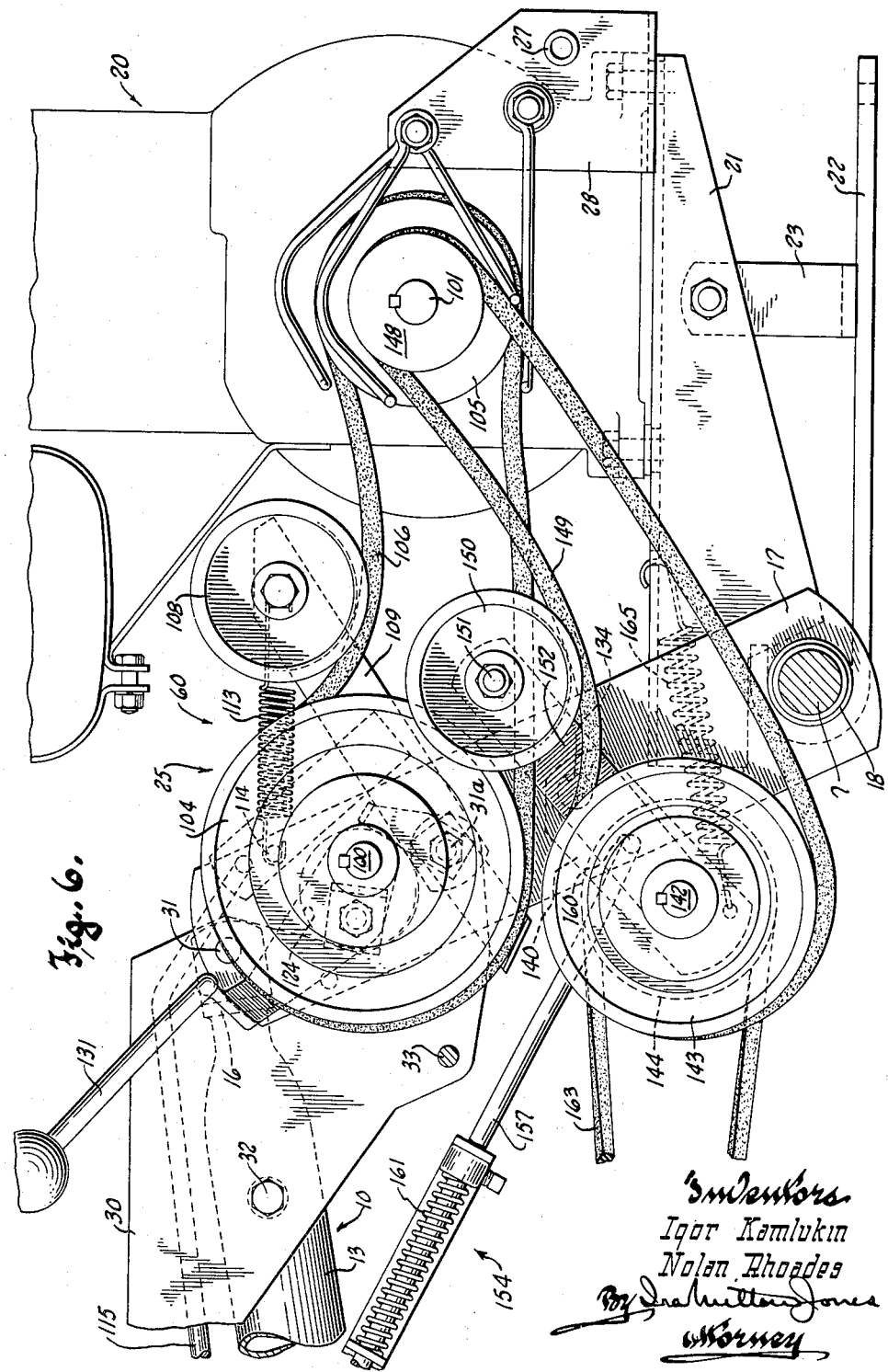

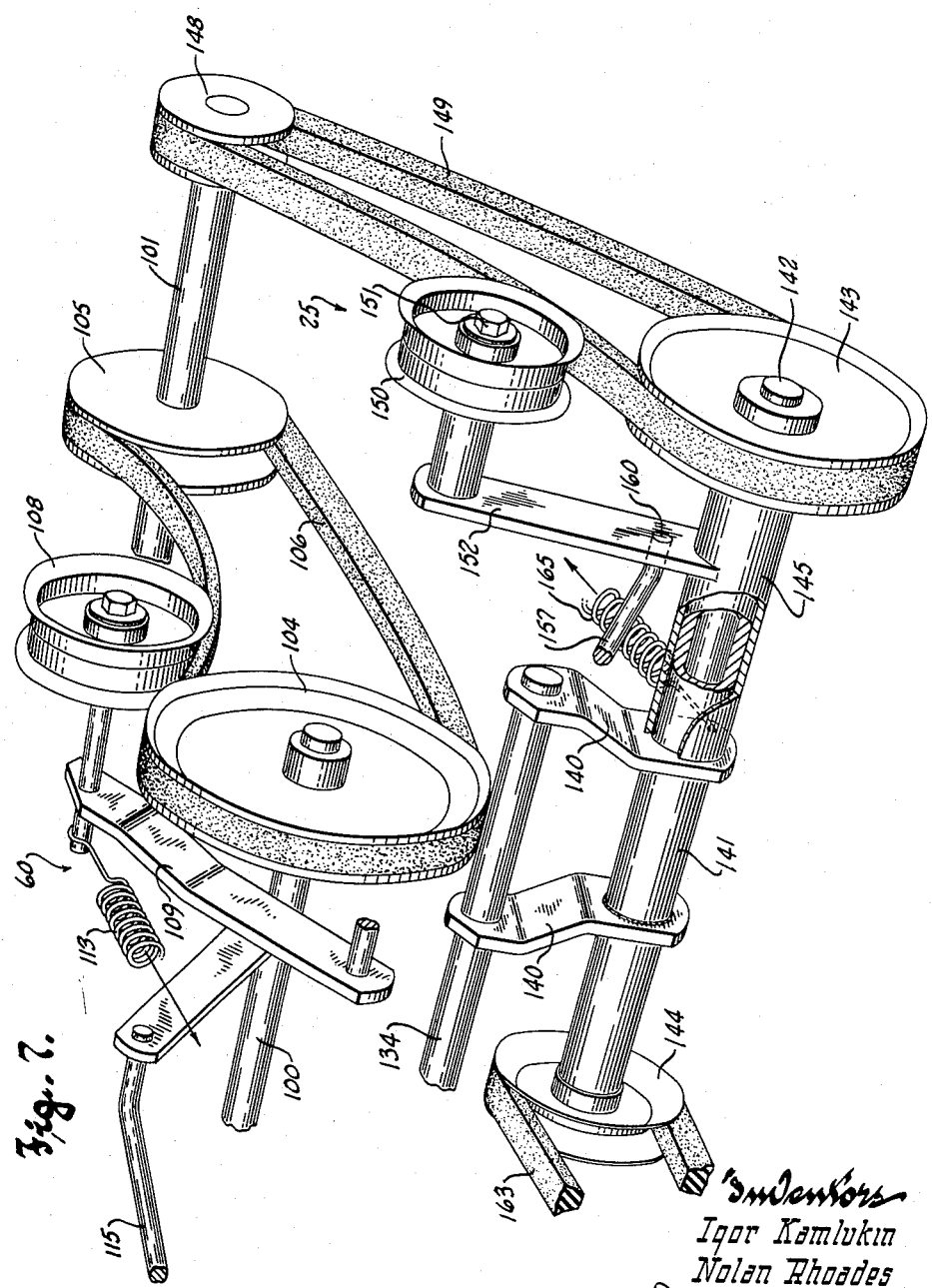

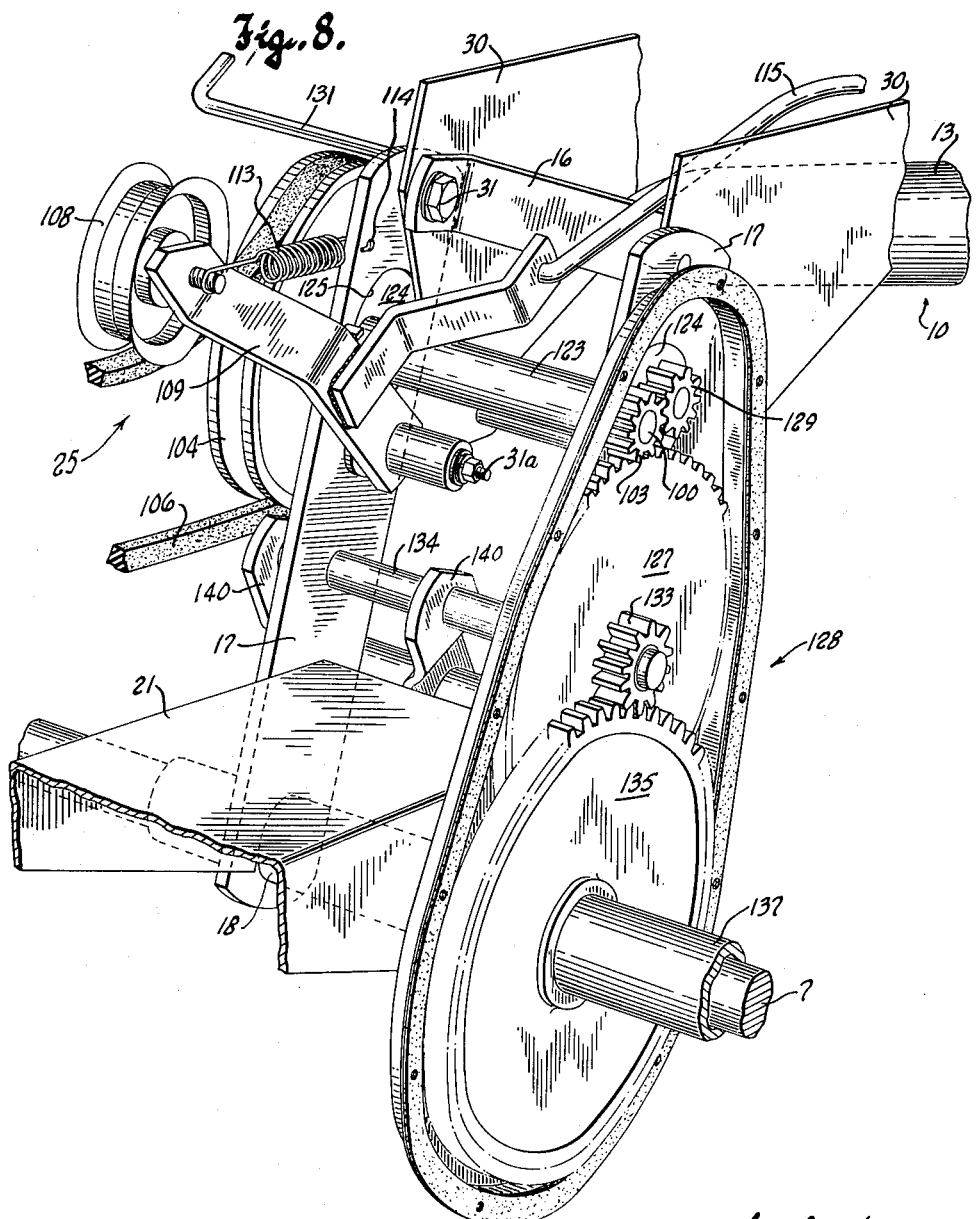

United States Patent Office 2,989,134
Patented June 20, 1961

2,989,134
TRACTOR HAVING A COMBINED STEERING AND CLUTCH CONTROL LEVER
Igor Kamlukin, Milwaukee, and Nolan Rhoades, Beloit, Wis., assignors to Simplicity Manufacturing Company, Port Washington, Wis., a corporation of Wisconsin
Original application Oct. 8, 1956, Ser. No. 614,695, now Patent No. 2,924,928, dated Feb. 16, 1960. Divided and this application May 28, 1959, Ser. No. 816,444
2 Claims. (Cl. 180—77)

This invention relates generally to tractors, and has more particular reference to improvements in lightweight tractors of the type designed particularly for use with power lawn mowers for residential purposes. This application is a division of our copending application, Serial Number 614,695, filed October 8, 1956, entitled Power Driven Lawn Mowing Device and since issued as Patent No. 2,924,928.

One of the objects of this invention is to provide a small, lightweight lawn tractor which is constructed to readily accommodate a lawn mowing element in a substantially unobstructed implement receiving space between the front and rear wheels of the tractor and under the driver and longitudinal frame means of the tractor chassis, so as to assure compactness of the lawn cutting device thus provided.

Another object of this invention is to provide a small lawn tractor of the character described having its power source located above and rearwardly of the rear axle of the tractor, behind the driver's seat, whereby the driver is protected against the heat and exhaust fumes of the internal combustion engine which provides the power source.

A further object of this invention resides in the provision of a small tractor of the character described having a front axle with steerable front wheels at its ends, and which incorporates novel steering mechanisms by which the front wheels are turned in one direction or the other as a consequence of lateral tilting of an upright manually operable joy stick type of control member mounted on the front portion of the tractor chassis and extending to a level above that of the driver's seat but forwardly of the seat so as to be readily accessible to the operator of the tractor.

Still another object of this invention resides in the provision of a small tractor of the character described wherein the rear wheels are drivingly connected with the power source through a clutch device biased toward disengagement, and wherein engagement of the clutch device requires the operator of the tractor to pull back on the joy stick steering control member, against the bias acting upon the clutch device. With this arrangement it will be apparent that a dead-man type of control is provided for the tractor, requiring the operator to exert and maintain a slight clutch engaging force on the joy stick steering control member in order to operate the tractor, and that disengagement of the clutch, with resulting disruption of the transmission of driving torque to the rear wheels, will occur automatically in the event the steering control stick is released by the operator.

Another object of this invention resides in the provision of a small tractor which, though designed particularly for use with lawn mowing attachments of either the rotary or reel typs, has exceptional versatility in that it may be used for a variety of gardening and lawn tending tasks. A further object of the invention resides in the provision of a lightweight lawn tractor of the character described, which features a joy stick steering and clutch control member that may be swung forwardly and used as a draw bar to facilitate pulling the tractor about manually.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 3 is an enlarged perspective view of the front end portion of the tractor chassis;

FIGURE 4 is a detail sectional view through one of the front wheels of the tractor taken along the plane of the line 4—4 in FIGURE 1;

FIGURE 5 is a vertical sectional view through the rear axle of the tractor, taken along line 5—5 in FIGURE 1;

FIGURE 6 is an enlarged cross-sectional view through the rear axle taken along the plane of the line 6—6 in FIGURE 5;

FIGURE 7 is an enlarged more or less diagrammatic perspective view of the transmission and clutch mechanism shown in FIGURE 6; and FIGURE 8 is a fragmentary perspective view on an enlarged scale illustrating details of the tractor clutch and reversing mechanism.

Figure 1:
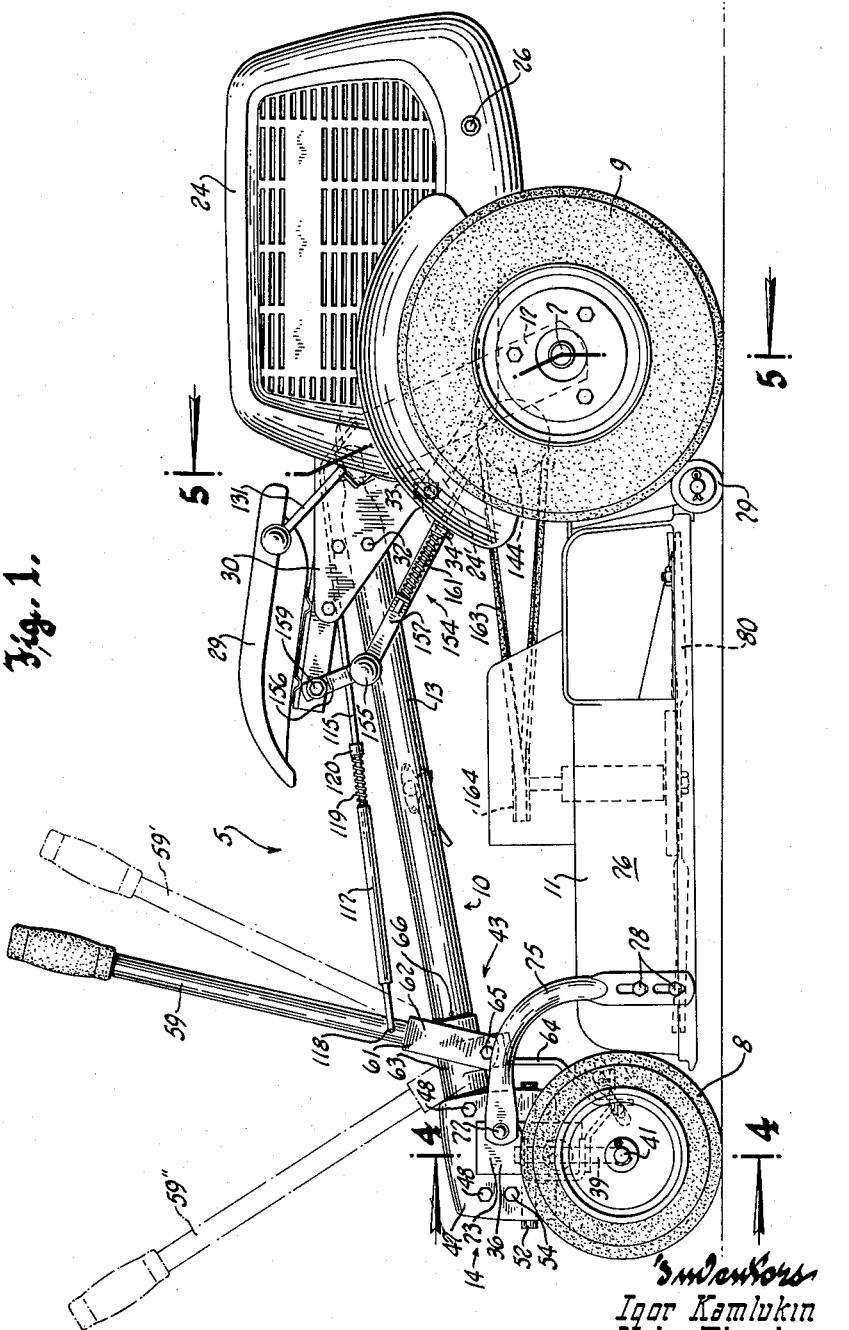
FIGURE 1 is a side elevational view of the tractor of this invention shown with a rotary lawn mower attached thereto.
Figure 2:
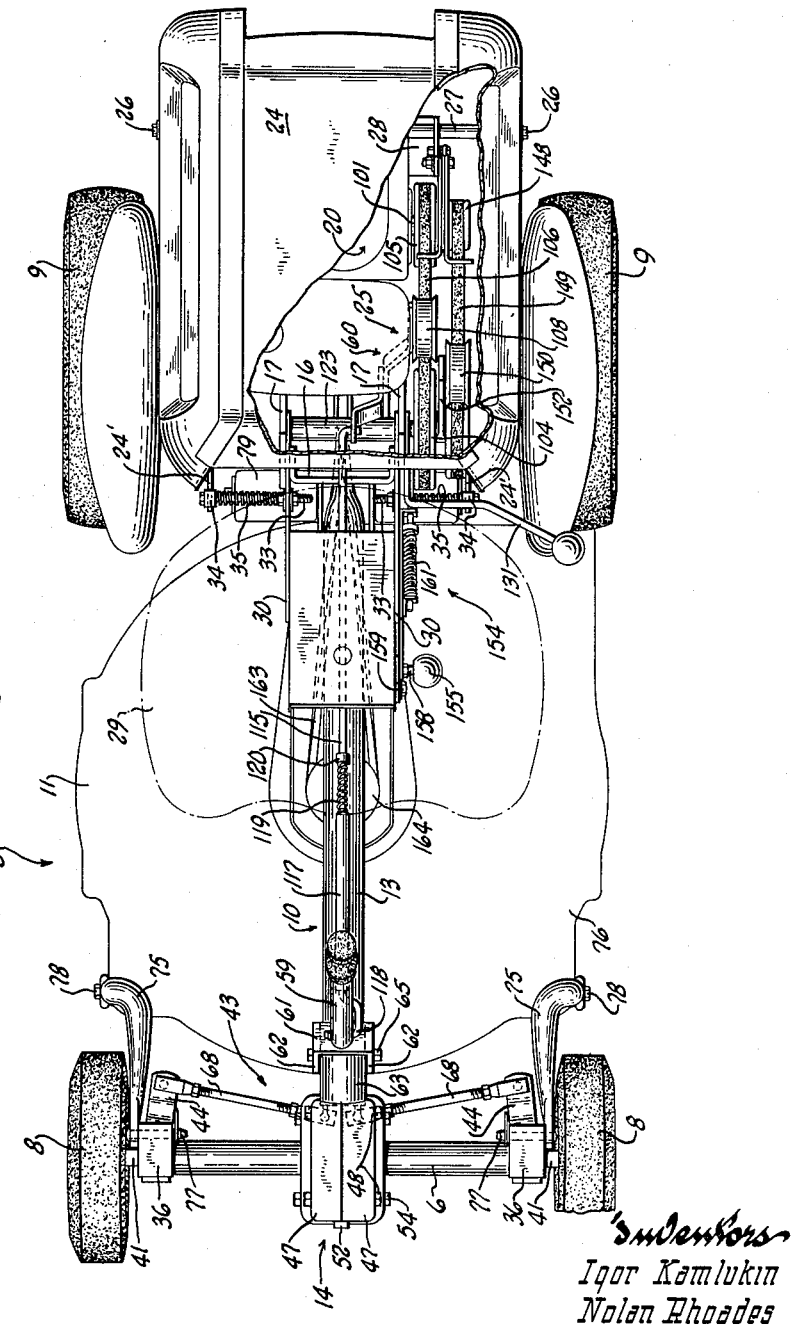
FIGURE 2 is a plan view of the tractor and attached rotary lawn mower shown in FIGURE 1.

Referring now more particularly to the accompanying drawings, in which like reference characters have been applied to like parts throughout the several views, the numeral 5 generally designates the short wheel base chassis of the lawn tractor of this invention. The chassis comprises front and rear axles 6 and 7, respectively, steerable front wheels 8 at the opposite ends of the front axle, drive wheels 9 on the opposite ends of the rear axle, and a centrally disposed longitudinal frame 10 having its ends connected with the medial portions of the front and rear axles to at all times maintain the same normal to the longitudinal dimension of the chassis. The frame 10 holds the axles spaced apart a distance sufficient to accommodate, between the front and rear wheels, a rotary lawn mowing element 11 described in greater detail in our aforementioned copending application, Serial No. 614,695 filed October 8, 1956. It is understood, of course, that the tractor of this invention is not restricted to use with a rotary lawn mowing element or even to the positioning of such an element so that it is straddled by the frame, since the tractor of this invention operates equally well with a snow plow, ground roller, or the like connected to the tractor forwardly or rearwardly of the frame.

One of the outstanding characteristics of the frame is that it is comprised of a single elongated tube 13. The front end of the tube is fixed in a swivel head 14 which in turn is mounted on the medial portion of the front axle 6, and the rear end of the tube is fixed to the bight portion 16 of a fork having spaced downwardly extending arms 17. The lower ends of the fork arms are fixed to a fork supporting sleeve 18 in which the rear axle 7 is rotatably journaled.

The swivel head 14 and the fork cooperate with one another to mount the frame tube 13 medially of the chassis but slanting upwardly toward the rear thereof, and with the tube at an elevation spaced well above a plane containing the axes of rotation of the front and rear wheels 8 and 9, respectively. Consequently, a substantially unobstructed implement receiving space is provided beneath the frame tube and between the front and rear wheels of the tractor in which either a rotary or a reel type lawn mowing element may be accommodated and tractively coupled to the front axle of the tractor.

The power source for the tractor comprises a prime mover, preferably an internal combustion engine, indicated at 20, mounted above and behind the rear axle 7 on an engine supporting platform 21 welded to the fork with the platform disposed at a level slightly above the level of the rear axle. As shown best in FIGURES 5 and 6 the engine supporting platform is a substantially inverted channel shaped member having its forward end portion received between and fixed to the fork arms 17, and having a rear end portion which extends rearwardly from the fork, in cantilever fashion, to mount the engine 20. In addition to supporting the internal combustion engine the platform 21 also contibutes to the support of a drawbar 22 having its forward portion hooked around and fixed to the mid-portion of the fork supporting sleeve 18 and having its rearwardly projecting portion suspended from the engine platform by a hanger 23. The drawbar 22, of course, makes it possible to pull any desired accessory, such as a lawn roller, seeder, small wagon, etc.

The engine is covered by a hood 24 large enough to accommodate clutch controlled transmission mechanism 25 through which driving torque may be transmitted to the rear wheels 9 from the engine. The hood is pivotally supported on the rear portion of the engine platform by a pair of opposite transversely aligned screws 26 secured in the sides of the hood and threaded into holes in the ends of a rod 27 fixed in upstanding brackets 28 on the rear end portion of the engine supporting platform 21. Hence the hood may be swung upwardly and rearwardly out of its normal position covering the engine and transmission mechanism, in a clockwise direction as viewed in FIGURE 1, to an open position at which access may be had to the engine and transmission mechanism for purposes of inspection, adjustment, and/or repair.

The tractor is further provided with a seat 29 for the driver, and it is a feature of this invention that the seat is located above and slightly forwardly of the rear wheels 9 so as to be ahead of the engine and directly over the rear portion of the implement receiving space between the front and rear wheels of the tractor. The seat 29 is mounted on the rear portion of the chassis by means of a pair of flat laterally spaced brackets 30, the rear portions of which are flatwise secured to the upper portions of the fork arms by screws 31 at the upper ends of the fork arms, and by bolts 31a and 31b at the medial portions of the fork arms, while the intermediate portions of the brackets are anchored to the frame tube by a bolt 32.

With the seat mounted in this location, that is, ahead of the power source, the driver of the tractor is not subjected to the heat or the fumes of the internal combustion engine, and his location above a rotary lawn mowing element 11 in the implement receiving space protects him against injury from flying stones impinged by the rotating blades of the mower element during operation of the device. It will also be noted that since the tractor has a short wheel base, a driver occupying the seat 29 straddles the frame tube 13 and may rest his feet upon the front axle 6 at opposite sides of the swivel head 14.

The seat brackets also have a pair of studs 33 fixed thereto and projecting outwardly therefrom on a common transverse axis, each carrying a U-shaped latch 34 at its outer end. These latches may be swung around the studs to operative positions engaging over the front ends of forwardly projecting arms 24' on the front of the hood 24 to releasably hold the hood in place covering the engine and transmission 25. The engagement of the under edges of the arms 24' with the studs 33, of course, defines the normal position of the hood, and the latches are frictionally held in an operative position preventing the hood arms from lifting off the studs 33, by means of coiled compression springs 35 encircling the studs and confined axially between each latch and the adjacent seat bracket 30.

According to this invention the front axle 6 is comprised of a transverse shaft having an upstanding bearing bracket 36 rigidly secured to each extremity thereof, as by welding. Each of these bearing brackets is provided with spaced apart horizontal flanges 37 having vertically aligning holes 38 therein to rotatively receive the upright leg 39 of an L-shaped spindle 40, the horizontally disposed leg 41 of which projects outwardly and has one of the front wheels 8 freely rotatably journaled thereon. The brackets 36 and the spindle 40, therefore, provide steering knuckles for the front wheels by which they may be turned about the vertical axes of the upright legs 39 of the spindles to control the direction of travel of the tractor.

As will be described in more detail shortly, steering mechanism 43 is provided to enable the front wheels 8 to be turned in unison by the driver of the tractor so that he may readily control its direction of travel.

The opposite end portions of the front axle 6 are supported by the front wheels 8 as is customary, but in the present case this is effected in an exceedingly simple manner by having the lower flanges 37 of the bearing brackets on the ends of the axle rest upon the forward end portions of steering arms 44 which are fixed to the upright legs 39 of the spindles. Pins 45 secured in the upper ends of the upright legs of the spindles, above the upper flanges 37, thus cooperate with the forward ends of the steering arms in holding the ends of the front axle against up and down motion relative to the front wheels.

As indicated previously, the front end portion of the frame tube 13 is connected with the mid-portion of the front axle 6 by means of a swivel head 14. As shown best in FIGURE 3 the swivel head is comprised of complementary laterally adjacent hollow housing sections 47 which are clamped around the front end portion of the frame tube by bolts 48 extending through both sections as well as the frame tube, so that the swivel head is rigidly attached to the tube and becomes a part of the frame.

The connection between the swivel head and the mid-portion of the front axle 6 is designed to provide for a limited degree of tilting motion of the front axle about a longitudinal axis medially of its ends, and relative to the frame. For this purpose the axle has a substantially U-shaped bracket 50 fixed to its mid-portion, as by welding, with its upstanding arms 51 spaced forwardly and rearwardly of the axle and projecting into the open underside of the swivel head. These arms have longitudinally aligning holes therein to freely rotatably receive a hinge pin 52. The hinge pin is so supported by the bracket 50 as to be disposed on a horizontal axis, and it extends over the front axle and beyond the arms 51 of the bracket to have its opposite end portions clampingly embraced by the lower edge portions of the complementary housing sections 47 of the swivel head.

As seen best in FIGURE 3, the projecting end portions of the hinge pin are received in notches 53 in the end walls of the housing sections, and a second pair of bolts 54 is preferably provided to hold the housing sections 47 clamped tightly onto the hinge pin. Longitudinal motion of the front end of the frame relative to the axle may be prevented in any suitable manner, for instance by so spacing the upright arms 51 with respect to the fore and aft end walls of the swivel head housing as to constrain the front axle to tilting motion only about the hinge pin.

Tilting motion of the front axle in opposite directions about the hinge pin 52 is both provided for and limited by means of notches 57 in the lower edge portions of the side walls of the swivel head. These notches are directly over the front axle and thus enable it to tilt an extent determined by engagement of the axle with the bottoms of the notches. It is also important to note that the tilt axis for the front axle is above the axle, between it and the front end portion of the frame tube 13.

Referring to FIGURE 1, it will be noted that the swivel head 14 cooperates with the fork on the rear of the frame tube to dispose the tube at an elevation a substantial distance above a plane containing the axes of rotation of the front and rear wheels and with the rear of the frame tube slanting upwardly and rearwardly so as to be located as high as possible under the seat.

The steering mechanism 43 comprises an upright joy stick type of manually operable control member 59 supported by the front end portion of the frame tube 13 for both lateral and fore and aft rocking motion. The side to side rocking of the control stick 59 is translated into steering motion of the front wheels through the rearwardly projecting steering arms 44, while the fore and aft rocking motion of the control stick is employed to effect engagement and disengagement of a clutch device 60 by which the transmission of driving torque from the internal combustion engine to the rear wheels may be governed.

In order to provide for such lateral and longitudinal rocking motion of the steering control stick, its lower end is fixed to the bight portion of a clevis 61 having downwardly projecting arms 62 which straddle the frame tube 13 rearwardly of the swivel head 14 and loosely embrace a sleeve 63 freely rotatably journaled on the bearing provided by the front portion of the frame tube. The sleeve 63 comprises the hub of a downwardly extending lever 64 to which the clevis arms 62 are pivotally secured by a cross bolt 65.

The bolt 65 thus supports the lower end portion of the steering control stick 59 for fore and aft rocking motion about a transverse axis slightly beneath the front end portion of the frame tube, while the sleeve 63, to which the lever 64 is attached, provides for transverse rocking of the steering control stick about the longitudinal axis of the frame tube itself. Sliding motion of the sleeve 63 lengthwise along the frame tube is precluded by its confinement between the rear of the swivel head 14 and a pin 66 fixed in the side of the frame tube.

The lower end of the lever 64 is disposed substantially medially between the rear ends of the steering arms 44, and it is connected with them by means of a pair of steering links 68 having ball and socket connections at their opposite ends with the arms and the lever.

Since the steering control stick 59 extends upwardly above the level of the driver's seat and is located forwardly thereof, it is readily accessible to the driver of the tractor. Lateral rocking of the stick in opposite directions, of course, will be translated through the steering links and arms into simultaneous pivotal motion of the front wheels in one direction or the other about the vertical legs of their spindles, so as to readily control the direction of travel of the tractor.

In order to facilitate steering and aid in maintaining a straight-away condition of the front wheels, a pair of torsion type centering springs 70 is provided. As shown best in FIGURES 3 and 4, each of the torsion springs 70 encircles the upright leg 39 of one of the wheel spindles and has one end thereof reacting against the bearing bracket 36 and its other end hooked about a pin 71 fixed in the side of the spindle.

The torsion springs are so arranged, however, as to tend to turn the front wheels simultaneously in opposite directions. As an example, it may be assumed that the springs tend to turn the wheels to bring their front portions inwardly, toward one another, so that one of the torsion springs will always assist the operator when making a turn, while the other spring opposes the turn. While both springs cooperate with one another and with the steering links and arms to tend to hold the wheels in line with the rear wheels, their primary function is to facilitate initial returning motion of the wheels toward straightaway, after a sharp turn has been negotiated.

The bearing brackets 36 on the opposite ends of the front axle 6 also provide anchors to which an implement such as a lawn mowing element 11 of either the rotary or reel type may be tractively coupled. For this purpose each of the bearing brackets is provided with upright laterally spaced flanges 73 having transversely aligning holes 74 therein, the holes in the two brackets being coaxial. Upwardly and forwardly extending arms 75 having their lower ends secured to the opposite sides of the housing 76 of the rotary lawn mowing element 11, provide for tractively coupling the mowing element to the brackets 36. The forward end portions of these arms overlie the outer flanges 73 of the bearing brackets and are pivotally secured thereto by means of pins 77 received in each pair of holes 74 in the brackets.

The arms 75 are rigidly but vertically adjustably secured to the housing 76 of the mowing element by screws 78, and their pivotal connections with the bearing brackets thus cooperate with transverse ground engaging roller means 79 on the rear of the housing to support the mowing element with its horizontally rotating blades 80 spaced a definite distance above the ground. The pivot pins 77, of course, provide for up and down swinging motion of the mowing element about a transverse axis and also constrain the mowing element to sidewise tilting motion with the front axle as described and claimed in our copending application, Serial No. 614,695, filed October 8, 1956.

Referring now to the rear axle, as seen best in FIGURE 5, it will be noted that the hub of the left rear wheel 9 is fixed directly to one end portion of the shaft which comprises the axle, and is at all times drivingly connected with one of the drive gears 84 of a spur gear differential 85 located on the axle near its opposite end. The hub of the right rear wheel is fixed to a sleeve 86 freely rotatably encircling the adjacent end portion of the shaft and has the other drive gear 87 of the differential fixed directly thereto. The differential, of course, enables driving torque to be transmitted to either or both rear wheels and permits either wheel to rotate at a greater rate than the other when the tractor is negotiating a turn.

The transmission mechanism 25, by which the rear wheels are drivingly connectable with the engine 20, is mounted on the frame fork at the rear of the chassis so as to be located over the rear axle and between the rear wheels. The transmission mechanism is shown best in FIGURES 6, 7 and 8 and comprises a main drive shaft 100 extending transversely through the fork arms and rotatable on a horizontal axis spaced forwardly of and almost at the same level as the engine crankshaft 101. At its end nearest the differential 85, the main drive shaft has a drive pinion 103 fixed thereon, and a grooved pulley 104 fixed on the opposite end of the shaft, substantially in longitudinal alignment with a similar pulley 105 on the crankshaft and drivingly connectable with the latter by means of a V belt 106. The belt 106 normally quite loosely engages around the pulleys 104 and 105 so as to preclude the transmission of driving torque from the engine to the main drive shaft except when the belt is tightened into driving engagement with these pulleys. The clutch mechanism 60 mentioned hereinbefore is provided for that purpose.

The clutch mechanism comprises a grooved pulley 108 freely rotatably mounted on an arm 109 to track upon the upper stretch of the belt 106 and the arm 109, in turn, is pivotally mounted on the lower bolt 31a which connects the adjacent seat bracket to the frame fork. As seen in FIGURE 6, therefore, the clutch pulley 108 may be swung bodily toward and from the upper stretch of the belt 106, about a transverse axis which is located close to and nearly directly below the axis of the main drive shaft 100.

A coiled tension spring 113 having its rear end connected to the free end porton of the arm 109 and its forward end anchored to the frame fork as at 114 (FIG- URE 6) at all times exerts a force upon the arm tending to swing the latter in a counterclockwise or clutch disengaging direction, as viewed in FIGURE 6. The clutch mechanism 60 is shown disengaged in FIGURE 6, and the drivng connection between the engine crankshaft and the main drive shaft 100 accordingly is disrupted.

It is one of the features of this invention that the clutch mechanism 60 is operated by a link 115 which connects the pulley arm 109 with the joy stick steering control member 59. Hence, the clutch will be engaged to drivingly connect the engine with the main drive shaft only so long as the operator holds the steering control member tilted rearwardly to a position such as indicated by construction lines at 59' in FIGURE 1.

It is another feature of this invention, however, that the rearward thrust of the steering control element 59 necessary to tighten the belt 106 about the pulleys 104 and 105 is impositively transmitted to the arm 109 which carries the clutch pulley 108. Refrring to FIGURE 1, it will be noted that a substantial length of the forward end portion of the link 115 is endwise slidably received in a sleeve 117 which in turn is connected with the lower end portion of the steering control stick 59 as at 118, and that a compression spring 119 encircling the link is confined between the rear end of the sleeve 117 and a shoulder 120 on the link. Consequently, all of the rearward thrust necessary to engage the clutch for the establishment of the driving connection between the engine and the main drive shaft 100 must be transmitted to the link through the compression spring 119. The front end portion of the link 115, however, extends far enough inside the sleeve 117 as to readily permit the steering control stick 59 to be swung forwardly to the position indicated in construction lines at 59" in FIGURE 1, without pulling out of the sleeve. In its extreme forward position, the stick may be used as a handle by an operator to facilitate pulling the tractor about manually during storing of the tractor and/or removing it from storage.

As seen best in FIGURES 5 and 8 the main drive shaft 100 is freely rotatably journaled in a sleeve 123 each end portion of which is eccentrically secured in a disc 124. The discs 124, in turn, are freely rotatably received in holes 125 in the fork arms 17 so that when the discs are simultaneously rotated in the same direction the main drive shaft will be rocked bodily up or down about an axis spaced slightly forward thereof but parallel to the shaft. Such bodily rocking motion of the main drive shaft is relied upon to effect engagement and disengagement of the pinion 103 thereon with a large diameter gear 127 forming part of transmission gearing 128.

As shown in FIGURE 8 the disc 124 adjacent to the drive pinion 103 also has a second pinion 129 freely rotatably but eccentrically journaled thereon at the side of the pinion 103 remote from the engine crankshaft. The pinion 129 is at all times in mesh with the pinion 103 but it is spaced from the transmission gear 127 in the postions of the parts shown in FIGURES 5, 6 and 8 wherein the transmission is set for "forward" operation of the tractor. When the two discs 124 are rotated simultaneously in a clockwise direction as seen in FIGURE 8, however, the forward pinion 103 is disengaged from the transmission gear 127 and the reversing pinion 129 is brought into mesh with the transmission gear 127 to effect "reverse" travel of the tractor.

The sleeve 123 on the main drive shaft, and upon which the discs are mounted, serves to connect the discs for rotation in unison, and such rotation may be imparted to the discs by means of an upwardly and forwardly projecting gear shift lever 131 fixed to the sleeve and having a knob on its outer end disposed directly alongside the rear portion of the operator's seat 29 so as to be readily accessible to the driver of the tractor.

Referring to FIGURE 6, therefore, the hand lever is shown in its upward limit of motion at which it holds the main drive shaft in a lowermost position with its "forward" drive pinion 103 in mesh with the transmission gear 127. The operator of the tractor need merely push downwardly upon the hand lever to impart clockwise motion (as viewed in FIGURE 8) to the discs 124 in order to lift the main drive shaft and establish the "reverse" drive for the tractor.

As will be apparent from a consideration of FIGURE 5 the transmission gear 127 is fixed on the hub of an intermediate pinion 133 which is freely rotatably received on the end portion of a supporting shaft 134 extending transversely through and carried by the fork arms. The pinion 133 in turn meshes with a second large diameter transmission gear 135 which may be considered a part of the differential gearing, inasmuch as it is at all times drivingly connected with the end plate 136 of the differential housing through a sleeve 137 to which both are fixed. The sleeve 137, of course, is freely rotatable received on the shaft 7 of the rear axle.

The supporting shaft 134 is mounted on the fork arms with its axis substantially medially between and parallel to the axes of the rear axle 7 and the main drive shaft 100. A pair of transversely spaced arms 140, having one end rockably mounted on the supporting shaft and their opposite ends fixed to the exterior of a tube 141 swingably supports a power take-off shaft 142 with the latter freely rotatably journaled in the tube for rotation on an axis parallel to but slightly below and forwardly of the shaft 134, ahead of the frame fork, and at a level substantially corresponding to that of the axis of the hinge pin 52 on the swivel head 14. The arms 140, of course, mount the power take-off shaft for swinging motion, bodily, about the axis of the supporting shaft 134. The power take-off shaft projects a short distance from each end of the tube 141, and at one end it has a V groove input pulley 143 fixed thereto, while a V groove output pulley 144 is fixed to its opposite end portion and so located as to be substantially in the median vertical plane of the tractor chassis.

The input pulley 143 on the power take-off shaft is located substantially in longitudinal alignment with and ahead of a second V groove pulley 148 on the crankshaft of the engine and is drivingly connectable therewith by a V belt 149. The belt 149 normally quite loosely encircles the pulleys 143 and 148 but can be tightened into driving relationship therewith by means of a belt tightener or clutch pulley 150 arranged to track on the upper stretch of the belt and freely rotatably journaled on a stud 151 anchored in the upper rear end portion of an arm 152 having its other end fixed to a sleeve 145 loosely encircling the tube 141 and confined endwise between the hub of the input pulley 143 and the adjacent arm 140. Thus, it will be apparent that the power take-off shaft will be drivingly connected with the engine pulley 148 whenever the clutch pulley 150 is swung downwardly onto the belt 149 to tighten the same. If the clutch pulley is swung upwardly in a counterclockwise direction, to its position shown in FIGURE 6, the driving connection between the engine pulley 148 and the input pulley 143 on the power take-off shaft is disrupted by the resulting loosening of the belt 149.

Such back and forth swinging motion is imparted to the clutch pulley 150 in order to either establish or disrupt the driving connection between the power take-off shaft and the engine crankshaft by means of a manually operable overcenter type shift mechanism 154 having a knob 155 disposed alongside but below the driver's seat so as to be readily accessible to the driver. As seen best in FIGURE 1, this shift mechanism comprises a pair of upper and lower links 156 and 157, respectively, pivotally connected at one end thereof to a stud 158 carried by the knob 155. The opposite end of the shorter upper link 156 is pivotally mounted as at 159 on a forward extension of one of the seat brackets 30, while the remote end of the link 157 is pivotally connected as at 160 to the arm 152 which carries the clutch pulley 150. The link 157 comprises two endwise arranged and relatively movable link sections having a compression spring 161 confined therebetween and tending to lengthen the link, whereby the knee (knob stud 158) of the toggle linkage formed by the links 156 and 157 is maintained at one side or the other of a straight line joining the pivot axes of the remote ends of the links.

With the toggle shift mechanism 154 in its position seen in FIGURE 1, therefore, the clutch provided by the pulley 150 is disengaged to prevent the power take-off shaft from rotating with the engine crankshaft. In order to drivingly connect the power take-off shaft with the engine, the operator merely pulls upwardly and rearwardly on the knob 155 to snap the toggle linkage past dead center and at the same time cause the arm 152 of the clutch pulley to swing about the tube 141 supporting the power take-off shaft, in a clockwise direction as seen in FIGURE 6, and thereby carry the pulley 150 down onto the belt 149 to tighten the same around the pulleys 143 and 148. The downward and rearward thrust which the toggle linkage exerts on the arm 152 of the clutch pulley is also imposed on the power take-off shaft itself, causing the latter to rock slightly in the counterclockwise direction, as viewed in FIGURE 6, about the axis of its supporting shaft 134, to thus tighten a belt 163 connecting the output pulley 144 with a cooperating pulley 164 on the blade assembly of the lawn mowing element 11.

A tension spring 165 connected between the engine supporting platform 21 and the lower end of one of the arms 140 at a point below the power take-off shaft, tends at all times to swing the power take-off shaft in the counterclockwise direction about the axis of its supporting shaft 134, and thus cooperates with the spring 161 on the shift mechanism 154 to hold the belt 163 tight in the engaged position of the clutch pulley 150.

Attention is directed to the fact that the output pulley 144 on the power take-off shaft is located midway between the rear wheels of the tractor, and in approximate alignment with the axis of the hinge pin 52 on the swivel head. This disposition of the output pulley minimizes misalignment between it and the pulley 164 on the shaft of the mowing element 11 due to tilting of the mowing element with the front axle. In this respect, it should be noted that the pulley 164 on the mowing element is also in approximate alignment with the axis of the hinge pin 52.

From the foregoing description taken together with the accompanying drawings, it will be readily apparent to those skilled in the art that this invention provides a tractor which is exceptionally compact, easy to maneuver both manually and under power, and capable of having any of a number of gardening or lawn working attachments tractively coupled thereto and of supplying power to the blade elements of such attachments as rotary or reel type lawn mowers.

What is claimed as our invention is:

1. In a power driven tractor: a chassis consisting essentially of a single longitudinally extending centrally disposed narrow structural element supported on rear drive wheels and steerable front wheels; a seat mounted on the rear portion of the centrally disposed structural element so that an operator on the seat straddles the centrally disposed structural chassis element; an engine mounted on the rear portion of the chassis behind the seat; transmission means including clutch mechanism biased to a normally inoperative position, to drivingly connect the engine with the rear wheels; a control member projecting up from the front end portion of the centrally disposed structural chassis element so as to be readily accessible to an occupant of the seat; means mounting the control member on said structural element for side-to-side and fore and aft rocking movement; steering mechanism connecting the control member with the front wheels and through which side-to-side rocking movement of the control member steers said wheels; a link connected with the clutch mechanism and extending forwardly under the seat and along the centrally disposed structural chassis element toward the control member; a unidirectional driving connection between the control member and said link operable to transmit a clutch engaging thrust upon the link in consequence of rearward rocking movement of the control member, but permitting forward rocking movement of the control member, rearward rocking movement of the control member being limited by said link and the clutch mechanism to a degree at which the control member remains sufficiently upright to enable steering; and means to limit forward rocking movement of the control member to an angle at which the control member though still sufficiently upright to enable side-to-side rocking thereof to effect steering, provides a handle to facilitate pulling the tractor about.

2. In a short wheelbase tractor: a chassis mounted on a pair of steerable front wheels and a pair of rear drive wheels, said chassis consisting essentially of a longitudinally extending straight tube lying in the median plane of the tractor; a seat mounted on the rear portion of the chassis so that an operator on the seat straddles the tube; a swivel head fixed to the front end of said tube and extending downwardly therefrom; a front axle to which the front wheels are connected; means rockably connecting the mid-portion of the front axle with the swivel head, said connecting means constraining the front axle to limited tilting motion in opposite directions about a longitudinal axis medially of the ends of the axle and between it and the tube; and steering mechanism for said front wheels including a lever member extending downwardly from the tube, means connecting the lower end of said lever member with the front wheels and through which side-to-side rocking of the lever member about a longitudinal axis steers the wheels, a manually operable control member projecting upwardly from the tube, means connecting the lower end of the control member to said lever member, in a manner providing for relative swinging motion of said members about an axis transverse to the tractor so that the control member may be moved fore and aft without moving the lever member, but constraining the members to move together upon side-to-side motion of the control member; and a hub connected to one of said members journalled on the tube closely behind the swivel head mounting said connected members on the tube with the control member in position in front of the seat to be readily accessible to the operator.

References Cited in the file of this patent
UNITED STATES PATENTS

| | | |
|---|---|---|
| 1,567,603 | King | Dec. 29, 1925 |
| 1,748,041 | Backhus | Feb. 18, 1930 |
| 1,928,915 | Stout | Oct. 3, 1933 |
| 2,035,032 | Wagner | Mar. 24, 1936 |
| 2,199,517 | Best | May 7, 1940 |

FOREIGN PATENTS

| | | |
|---|---|---|
| 525,224 | Great Britain | Aug. 23, 1940 |